United States Patent [19]
Legner

[11] Patent Number: 5,509,860
[45] Date of Patent: Apr. 23, 1996

[54] POWERSHIFT GEAR BOX, IN PARTICULAR TWO-SPEED EPICYCLIC GEAR BOX

[75] Inventor: Jürgen Legner, Friedrichshafen, Germany

[73] Assignee: ZF Friedrichshafen AG, Friedrichshafen, Germany

[21] Appl. No.: 356,331

[22] PCT Filed: Sep. 8, 1993

[86] PCT No.: PCT/EP93/02421

§ 371 Date: Jan. 25, 1995

§ 102(e) Date: Jan. 25, 1995

[87] PCT Pub. No.: WO94/07060

PCT Pub. Date: Mar. 31, 1994

[30] Foreign Application Priority Data

Sep. 12, 1992 [DE] Germany ............... 42 30 622.1

[51] Int. Cl.$^6$ .......................... F16H 3/54; F16H 61/06
[52] U.S. Cl. .................... 475/129; 475/140; 475/141
[58] Field of Search ........................... 475/129, 140, 475/141

[56] References Cited

U.S. PATENT DOCUMENTS

| | | | |
|---|---|---|---|
| 2,386,220 | 10/1945 | Lawler et al. | 475/129 |
| 2,807,968 | 10/1957 | Förster | 475/129 |
| 3,470,770 | 10/1969 | Fisher | 475/129 X |
| 4,225,029 | 9/1980 | Ushijima | 475/129 X |
| 4,450,735 | 5/1984 | Koivunen et al. | 475/140 |
| 4,787,271 | 11/1988 | Brogdon | 475/140 |
| 4,903,549 | 2/1990 | Ueki et al. | 475/129 X |
| 4,955,852 | 9/1990 | Morisawa | 475/140 X |
| 5,090,950 | 2/1992 | Sugano et al. | 475/129 |
| 5,092,201 | 3/1992 | Hayakawa et al. | 475/129 |

FOREIGN PATENT DOCUMENTS

| 2535810 | 5/1984 | France | 475/140 |
|---|---|---|---|

Primary Examiner—Charles A. Marmor
Assistant Examiner—Nathan O. Jensen
Attorney, Agent, or Firm—Davis, Bujold & Streck

[57] ABSTRACT

The invention relates to hydraulically engaged by means of two friction clutches (9 and 10). For that purpose, friction elements (outer and inner disks 13, 14 and 19, 20) are alternatively engaged and disengaged by the force exerted by plate springs (16, 22) or by hydraulic fluid. A mechanism associated with one of the friction clutches (9 or 10) prevents the full force of the spring from acting on the friction elements when the gear is shifted down from a higher to a lower step. An accumulator (30) is preferably used to influence the torque transmission during a downshift. An essential advantage of the disengaged arrangement consists in the smoothness of the shifting operation during downshifts, avoiding a particularly disagreeable hard shifting which is otherwise felt.

4 Claims, 3 Drawing Sheets

PRESSURE TRANSMISSION IN A DOWNSHIFT

TORQUE TRANSMISSION IN A DOWNSHIFT

POWERSHIFT GEAR BOX, IN PARTICULAR TWO-SPEED EPICYCLIC GEAR BOX

The invention relates to a powershift transmission, in particular to a two-speed transmission that is preferably designed as an epicyclic transmission. The gear steps of said transmission are engaged by hydraulically actuated friction clutches. The friction elements (inner and outer disks) of the friction clutches are engaged by spring force and disengaged by oil pressure.

Two gears can be engaged in a powershift transmission of the above kind. The friction clutches (one of said friction clutches acting as a brake) are alternatively disengaged and engaged when shifting the gears. The friction clutches are engaged by plate springs. When both friction clutches are pressureless, that is, engaged, the input and output are blocked (parking brake).

Due to the relatively strong force of the plate springs, the pressure medium (hydraulic fluid) is discharged from the respective pressure chamber toward the tank within a very short time. The time needed for disengagement of the friction clutches depends on the delivery rate of a source (pump) of hydraulic fluid.

By installing check valves, with throttles connected in parallel, in the pipes leading to the pressure chambers, it can be ensured that the alternative disengagement and engagement of the friction clutches are coordinated in a manner such that the friction clutch to be engaged does not engage until the friction clutch to be disengaged is disengage.

The check valves, complemented by the throttles, are arranged so that, during disengagement, the oil stream can flow unobstructed into the respective pressure chamber. During engagement, the oil stream exiting the pressure chamber is drawn into the tank.

The moment of engagement can be controlled with said valves. The engagement operation itself, that is, the torque transmission of the friction clutch over a period of time, cannot be controlled thereby. As soon as the piston acting upon the friction elements in an engagement direction has overcome the release play (sum of the spacings of the inner and outer disks of a friction clutch in a disengage state), the torque transmitted by the friction elements suddenly rises to the maximum value. Since the engagement operation takes place within a very short time a hard shift is noticeably felt, this becomes particularly disagreeable in a downshift from second to first gear.

This invention is based on the problem of improving the shifting quality, especially in a downshift.

The above problem is solved by means in at least one of the friction clutches which prevents the whole spring force from acting upon the friction elements when the release play of the friction elements is reduced to zero or near zero. Said means is applied in at least the friction clutch which is engaged in a downshift from a higher to a lower gear. With said means it is possible to control the torque transmission of the friction clutch to be engaged when no more release play exists. Hereby, the shifting operation can be made smooth when downshifting to a lower gear.

In a preferred embodiment, check valves with throttles connected in parallel are inserted in leading to the pressure chambers of the friction clutches. An accumulator, which is likewise filled with hydraulic fluid during disengagement of a corresponding friction clutch, is attached to at least one of the pipes. The volume of hydraulic fluid temporarily stored in said accumulator is emptied via the throttle point during the engagement of the friction clutch. The emptying begins when the friction elements of the friction clutch come into contact, that is, when the release play has become zero. The engagement operation can be additionally influenced by the type and size (accumulator volume) of the accumulator.

An especially simple design is obtained when the accumulator is formed by a cylinder and a spring-loaded piston. The engagement operation can be coordinated in a simple manner by the characteristic line of the spring used.

It is also advantageous if the piston reaches a final position when the friction clutch is entirely engaged. The final position can be obtained, for instance, by a stop. The friction clutch transmits the maximum torque in said final position.

To make the shifting transitions in a downshift smoother, the accumulator is coordinated with the friction clutch that is disengaged when shifting to a higher gear.

Other features essential to the invention and the advantages resulting therefrom are to be understood from the following description of an embodiment.

In the drawings:

FIG. 1 diagrammatically shows a cross section through a powershift transmission and the elements required for shifting the transmission;

Figure 1:
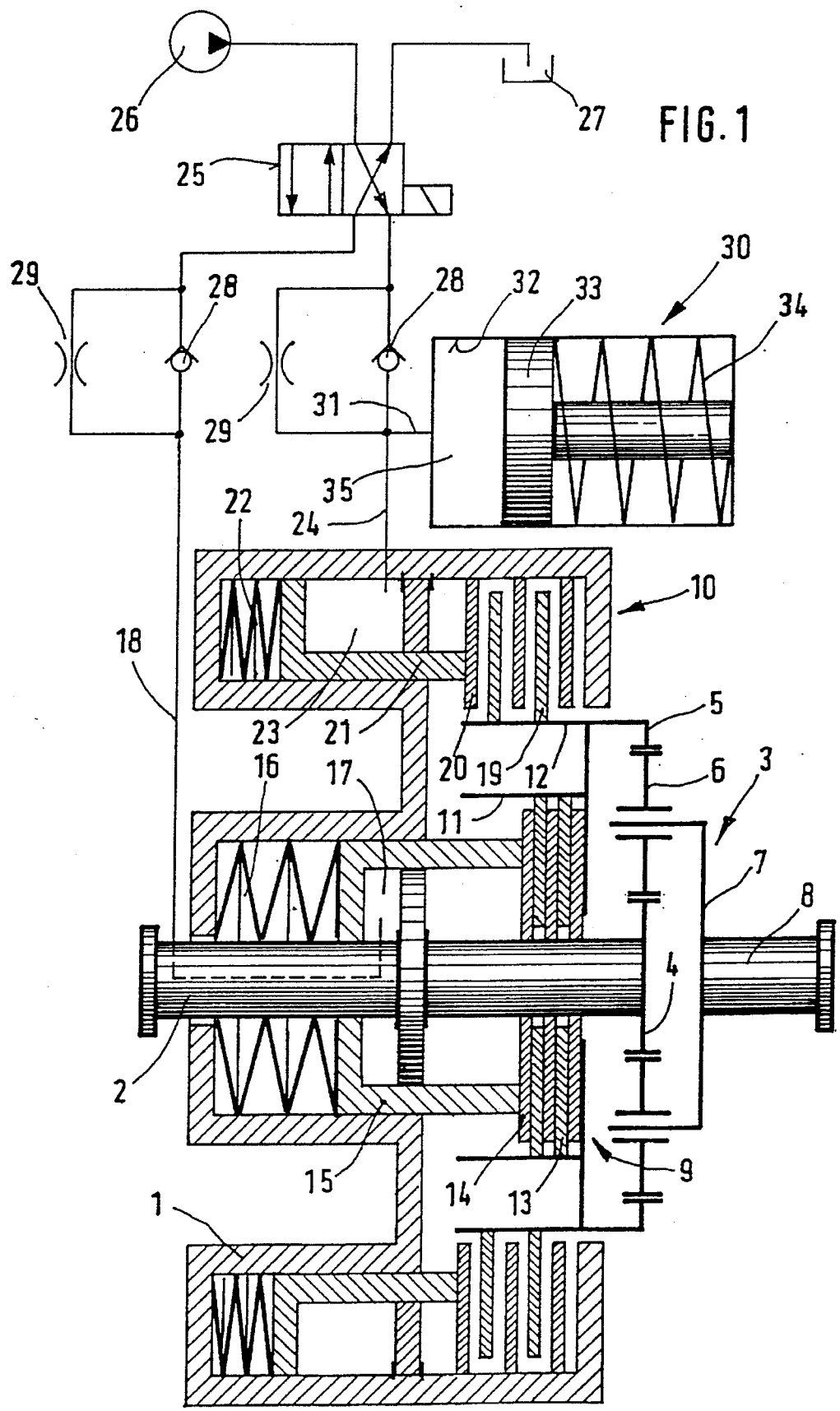

The transmission diagrammatically shown in cross section in FIG. 1 is a hydraulically shifting two-speed transmission. An input shaft 2 is rotatably supported in a housing 1. The input shaft 2 is driven by a prime mover, not shown. The prime mover can be, for instance, a continuously adjustable hydraulic engine or an electric motor. The hydraulically shifting transmission is preferably designed as an epicyclic transmission 3. The epicyclic transmission 3 is specifically comprised of an inner main gear 4, an outer main gear 5, several planetary gears 6 and a planet carrier 7. The planetary gears 6 are rotatably supported on the planet carrier 7 while the latter is non-rotatably connected with an output shaft 8. The output shaft 8 can be operatively connected with a stepped spur gear, not shown, by which an output shaft is driven for driving the gears of a wheel loader or the like.

Both gear steps of the powershift transmission are hydraulically shifted by two friction clutches 9 and 10. The outer friction clutch 10 is preferably concentrically situated relative to the inner friction clutch 9 and is designed as a brake. This part is designed as a friction clutch notwithstanding its function as a brake.

The outer main gear 5 has two disk carriers 11 and 12. Said two disk carriers 11 and 12 are preferably integral with the outer main gear 5.

The disk carrier 11, lying inside in the drawing, non-rotatably and axially movably carries outer disks 13 of the friction clutch 9 in a manner known per se. Inner disks 14 are non-rotatably and axially movably situated on the input shaft 2, belonging thereto, in a manner known per se.

A cup-shaped piston 15 is axially movably received in the housing 1. Said piston is loaded by several plate springs 16 so as to be moved in a engagement direction toward the outer and inner disks 13 and 14 of the friction clutch 9. In the interior of the piston 15 is a pressure chamber 17 to which leads a first pipe 18 through which hydraulic fluid such as oil is fed and removed.

From the above it follows that, when the pressure chamber 17 is pressureless, the friction clutch 9 is engaged by the force of the plate springs 16 which load the piston 15 and— referring to the drawing— moves it to the right. If, on the contrary, the pressure chamber 17 is charged with hydraulic fluid, the friction clutch 9 is disengaged against the force of the plate springs 16, that is, the piston moves to the left— referring to the drawing.

The friction elements of the friction clutch 10 consist of inner disks 19 that are fixed on the disk carrier 12 of the outer main gear 5 and outer disks 20 that are situated in the housing 1 in a manner known per se. Another piston 21 is provided that is axially slidingly received in the housing 1 and upon which acts a force exerted by plate springs 22 to disengage and engage the friction clutch 10. A pipe 24 leads to a pressure chamber 23.

As can be seen from the drawing, the friction clutch 9 is in a engaged state while the friction clutch 10 is disengage. The second gear is engaged. The torque of the input shaft is transmitted, on one hand, to the planetary gears 6 via the engaged friction clutch 9 and the outer main gear 5 and, on the other hand, to the planetary gears 6 via the inner main gear 4. The planet gear carrier 7 then transmits the added power to the output shaft 8.

The pipes 18 and 24 can be connected, via a gear shift valve 25 designed as a 4/2-way directional valve, either with a pump 26 or with a tank 27. A check valve 28, to which a throttle 29 is connected in parallel, is inserted in each pipe 18 and 24 between the gearshift valve 25 and the pressure chambers 17 and 23. The check valves 28 allow an unobstructed loading of the pressure chambers 17 and 23 with pressurized oil while the return stream of oil from the pressure chambers 17 and 23 to the tank 27 is throttled.

In order to engage the first gear when the friction clutch 10 is engaged, an accumulator 30 is attached by means of a connecting pipe 31 to the pipe 24 which constitutes the return pipe.

The accumulator 30 fundamentally consists of a cylinder 32 in which a piston 33 is axially movably received. The piston 33 is spring loaded, for instance, by a spiral pressure spring 34. When the second gear is engaged, as shown in the drawing, the pressure chamber 23 is filled with hydraulic fluid. The friction clutch 10 is disengaged. The accumulator volume 35 of the accumulator 30 is simultaneously filled with hydraulic fluid. The piston 33— spring loaded— is in the final position to the right as illustrated.

Figure 2:
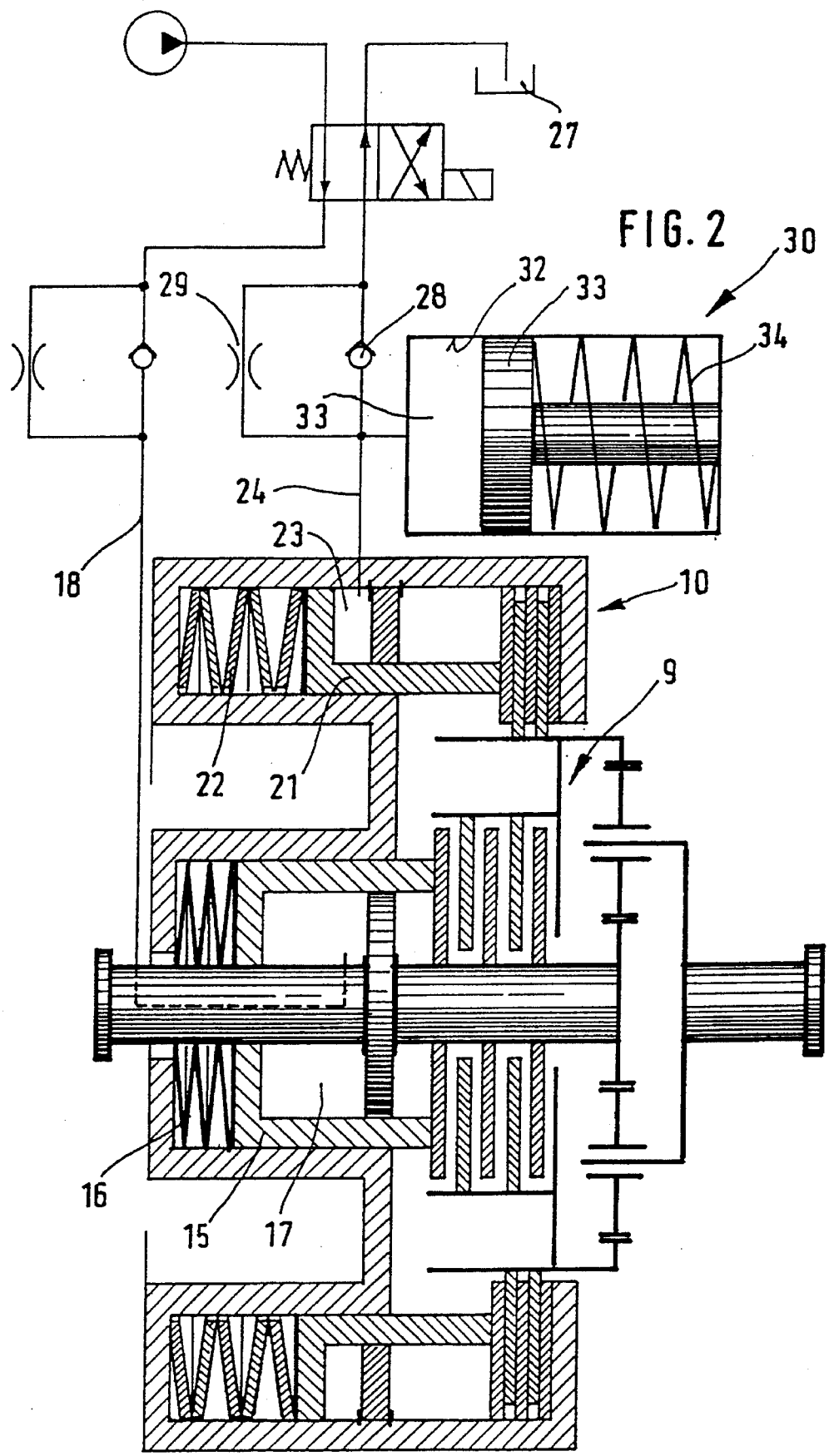
FIG. 2 shows the powershift transmission according to FIG. 1 in another shifting position.

Upon a downshift from second to first gear, the gearshift valve 25 changes its shifting position and assumes the shifting position indicated in FIG. 2. The pipe 18 is connected with the pump 26, while the pipe 24 leads to the tank 27 via the throttle 29— circumventing the check valve 28. During the downshift, the pressure chamber 17 is filled with hydraulic fluid. The piston 15 moves to the left against the force of the plate springs 16. The friction clutch 9 is disengaged.

The hydraulic fluid engaged in the pressure chamber 23 discharges via the throttle 29 to the tank 27. The piston 21 begins to move to the right due to the force of the plate springs 22. The friction elements (inner and outer disks 19 and 20) of the friction clutch 10 begin to approach each other until the release play becomes continuously smaller and finally assumes the zero value. This shifting condition is shown in FIG. 2. In order to prevent the friction clutch 10 from suddenly transmitting all of the torque when the release play of the friction elements has been reduced to zero, the characteristic line of the spiral pressure spring 34 of the accumulator 30 and the accumulator volume 35 are designed so that the piston 21 stops when the release play of the friction elements of the friction clutch 10 has been reduced to zero or near zero. The friction clutch 10 accordingly is not fully engaged. The accumulator 30 assumes a fixing function in the sense that a fixing pressure remains in the pipe 24 between the pressure chamber 23 and the check valve 28. Said fixing pressure is exhausted, not suddenly but steadily, due to the discharge of the pressurized oil enengaged in the accumulator 30 via the throttle 29. Due to the steady discharge of said fixing pressure, the friction clutch 10 is finally engaged completely with a steady transition. In this transitional phase (slipping phase of the friction elements of the friction clutch 10), the piston 33 moves to the left under the force of the spiral pressure spring 34 until the accumulator volume 35 has reached its minimum value. In this position, the piston 33 moves against an end stop, which is not shown. The piston has arrived at its final position. At this moment the hydraulic fluid received in the accumulator 30 has been discharged via the throttle 29 so that the plate springs 22 convey the piston 21 under fixing pressure to its final engagement position.

Figure 3:
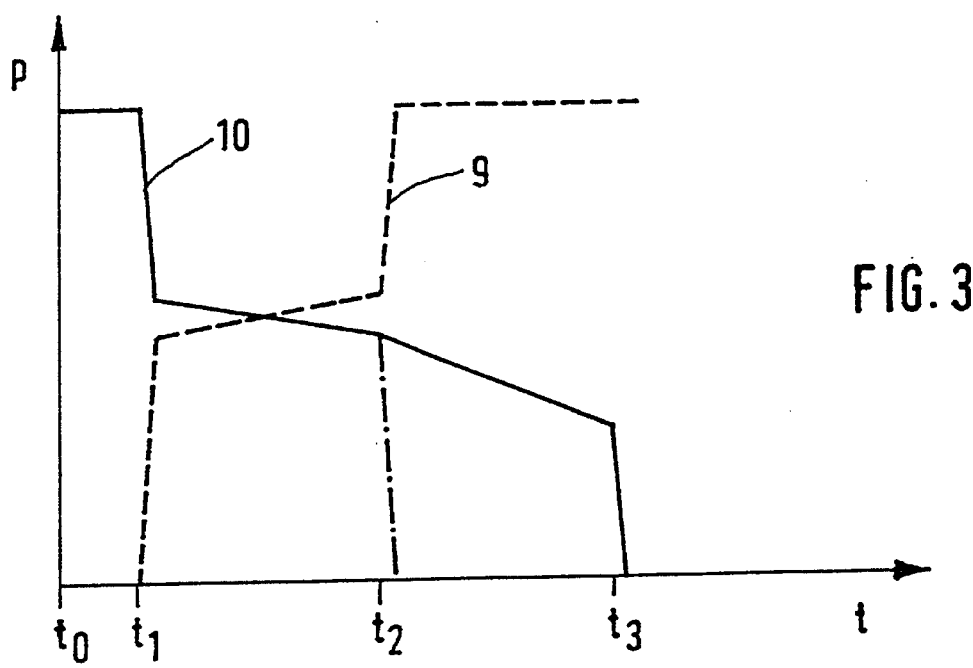
FIG. 3 shows a diagram reproducing the distribution of pressure over time during a downshift.

The transmission of pressure in the pressure chambers 17 (dotted line) and 23 (solid line) over time is to be understood from the diagram in FIG. 3. The downshift is started at the moment t1. The gearshift valve 25 is shifted. The piston 21 forces the oil enengaged in the pressure chamber 23 toward the throttle 29 until the moment t2. Without the accumulator 30 the pressure would drop very quickly to the zero value as indicated by the dot-dashed line. The accumulator 30 prevents a quick drop of pressure. The pressure in the pressure chamber 23 is downwardly modulated— depending on the characteristic line of the spiral pressure spring 34. The pressure in the pressure chamber 22 steadily drops over a period of time from t2 to t3. Starting from the moment t3, the pressure in the pressure chamber 23 quickly drops to zero.

Figure 4:
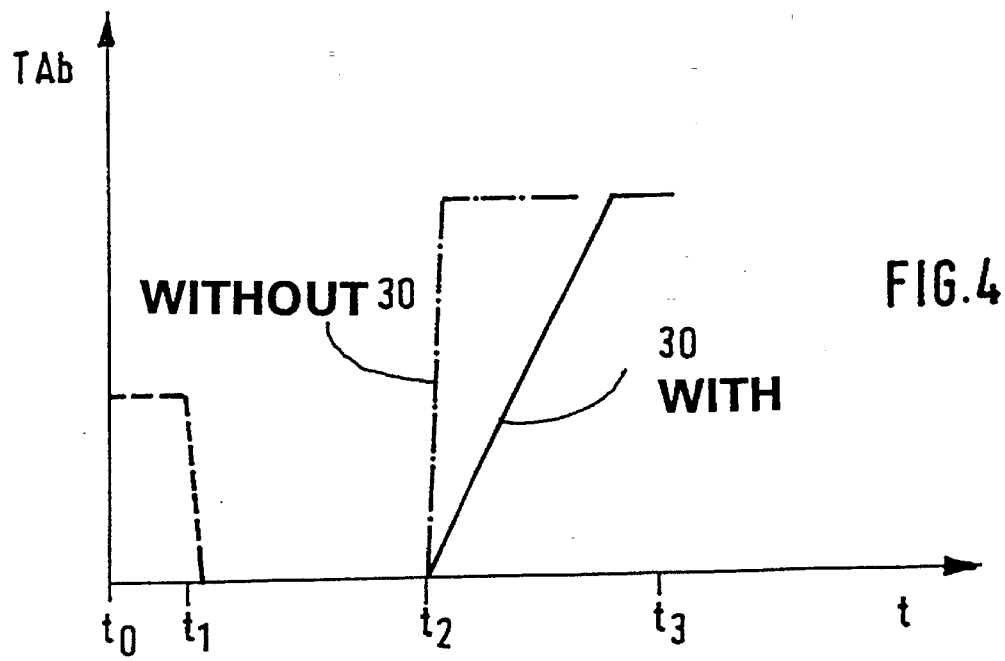
FIG. 4 shows a diagram representing the torque transmission during a downshift.

The torque transmission during a downshift is to be understood from the diagram corresponding to FIG. 4. The friction clutch 10 starts receiving the torque at the moment t2. Without the accumulator, the torque would increase very abruptly, as shown by the dot-dashed line. The increase of the torque is smoothed by the accumulator 30. The increase of the torque develops steadily over a period of time from t2 to t3.

The engagement operation can be controlled in several respects. A change in the period of time is possible by varying the cross section of the throttles 29. The engagement operation can also be controlled by varying the design of the characteristic line of the spiral pressure spring 34 (use of a different suitable spring obviously is possible) and by varying the accumulator volume.

The invention can also be used in rotary friction clutches. In this case the accumulator 30, the check valve 28 and the throttle 29 have to be situated between the pressure chamber 23 of the piston 21 and a leakage point in the hydraulic fluid supply (piston rings).

Reference Numerals 1 housing
2 input shaft
3 epicyclic transmission
4 inner main gear
5 outer main gear
6 planetary gear
7 planet gear carrier
8 output shaft
9 friction clutch 10 friction clutch
11 disk carrier
12 disk carrier
13 outer disks
14 inner disks
15 piston
16 plate spring
17 pressure chamber
18 pipe
19 inner disks
20 outer disks
21 piston
22 plate spring
23 pressure chamber
24 pipe
25 gearshift valve
26 pump
27 tank
28 check valve
29 throttle
30 accumulator
31 connecting pipe
32 cylinder
33 piston
34 spiral pressure spring
35 accumulator volume

I claim:

1. A powershift epicyclic transmission (3) having two speeds, the gear steps of which are alternatively engaged by hydraulically actuated friction clutches (9, 10), wherein friction elements (13, 14 and 19, 20) of said friction clutches (9, 10) are engaged by spring force (16, 22) and disengaged by oil pressure, wherein pipes (18, 24) lead to pressure chambers (17, 23) of said friction clutches (9, 10), check valves (28) having throttles (29) connected in parallel are inserted in said pipes (18, 24), wherein an accumulator (30) is attached to at least one of said pipes (18), which accumulator is filled with hydraulic fluid during disengagement of said friction clutch (9) and emptied via a throttle point (29) during engagement of said friction clutch (9) so that in at least one of said friction clutches (9 or 10) a full spring force (16 or 22) does not act upon said friction elements (13, 14 and 19, 20) after overcoming release play of said friction elements (13, 14 and 19, 20).

2. A transmission according to claim 1, wherein said piston (33) reaches a final position at the maximum transmissible torque of said friction clutch.

3. A transmission according to claims 1, wherein said accumulator (30) is associated with said friction clutch (9) which is disengaged when the higher speed is engaged.

4. A transmission according to claim 2, wherein said accumulator (30) is associated with said friction clutch (9) which is disengaged when the higher speed is engaged.

* * * * *